United States Patent

[11] 3,576,492

| [72] | Inventor | Tadikonda N. Rao<br>Plainfield, N.J. |
|---|---|---|
| [21] | Appl. No. | 826,406 |
| [22] | Filed | May 21, 1969 |
| [45] | Patented | Apr. 27, 1971 |
| [73] | Assignee | Bell Telephone Laboratories, Incorporated<br>Murray Hill, N.J. |

[54] MEAN POWER DETECTOR CIRCUIT EMPLOYING A SEMICONDUCTOR DIFFERENTIAL AMPLIFIER ON AN INTEGRATED CIRCUIT CHIP
1 Claim, 1 Drawing Fig.

[52] U.S. Cl. .................................................. 324/106,
307/310
[51] Int. Cl. .................................................. G01r 5/26
[50] Field of Search .................................................. 324/106,
95; 307/310

[56] References Cited
UNITED STATES PATENTS

| 1,920,785 | 8/1933 | Ford | 324/106X |
| 2,432,199 | 12/1947 | Kamm | 324/106X |
| 3,383,920 | 5/1968 | Greenly | 307/310X |
| 3,399,348 | 8/1968 | Praglin | 324/106X |
| 3,435,319 | 3/1969 | Richman | 324/106X |

Primary Examiner—Rudolph V. Rolinec
Assistant Examiner—Ernest F. Karlsen
Attorneys—R. J. Guenther and Edwin B. Cave ABSTRACT: A mean power detector circuit utilizes a differential amplifier on an integrated circuit chip to measure the true mean power of any waveform. A suitable resistor is thermally coupled to one transistor of the amplifier and is substantially isolated from the other transistor. When the resistor is connected to the signal to be measured, the thermal dissipation in the resistor affects the volt-ampere characteristics of the transistor to which it is coupled. Changes resulting from variations in ambient conditions or transistor characteristics are rejected by the differential arrangement. Thus the output of the amplifier is a measure of the mean power of the input signal and therefore is a measure of either the mean square voltage or the mean square current of the signal source.

Patented April 27, 1971 3,576,492
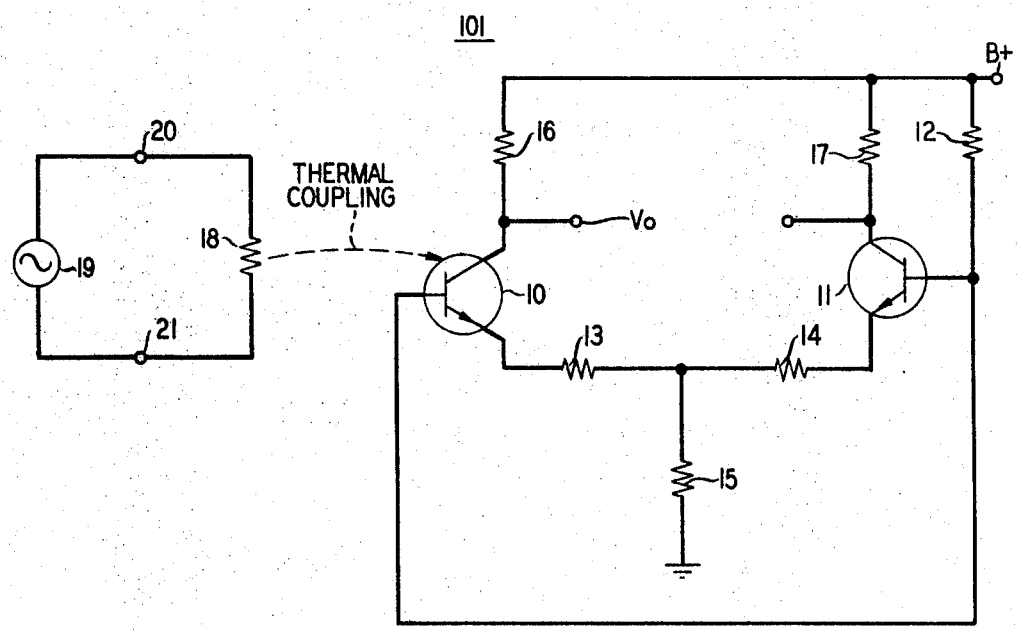
INVENTOR
T. N. RAO
BY
ATTORNEY

MEAN POWER DETECTOR CIRCUIT EMPLOYING A SEMICONDUCTOR DIFFERENTIAL AMPLIFIER ON AN INTEGRATED CIRCUIT CHIP

BACKGROUND OF THE INVENTION

1. Field of the Invention

This invention relates to measuring and detecting circuits and, more particularly, to mean power measuring circuits.

2. Description of the Prior Art

There exists a need for a simple, reliable means of measuring the true mean power level of a signal of arbitrary waveform. Such a measurement would be a direct measure of either the mean square voltage or the mean square current of the source supplying the signal. Most presently available power measuring apparatus cannot indicate true mean power for all signal waveforms. Additionally, due to the increasing use of integrated circuits, a need arises for a compatible power detector which might be formed as an integrated circuit. Presently available power measuring apparatus utilizes devices such as thermocouples, light sources, and inductor devices which cannot be formed as integrated circuits.

Accordingly, it is an object of this invention to improve the ability of power measuring apparatus to measure true means power for all waveforms.

Another object is to simplify power measuring apparatus.

A more specific object is to make power measuring apparatus compatible with integrated circuit technology.

SUMMARY OF THE INVENTION

The foregoing objects and others are achieved in accordance with the principles of the invention by a power measuring circuit which utilizes a differential amplifier to measure the true mean power of any waveform. The signal to be measured is connected to a resistor which is thermally coupled to one transistor of a differential amplifier stage and which is substantially thermally isolated from the other transistor. The thermal dissipation in the resistor affects the output of the transistor to which it is coupled. Changes in ambient conditions cause equal changes in both transistors of the amplifier and are thus rejected by the differential arrangement. The output of the amplifier, taken across the collector terminals of the two transistors, is a measure of the mean power of the input signal. Thus, the output is also a measure of the mean square voltage or the mean square current of the source supplying the input signal.

BRIEF DESCRIPTION OF THE DRAWING

The single FIG. of the drawing is a schematic of the power detector circuit of the invention.

DETAILED DESCRIPTION

The mean power detector circuit 101 shown in the drawing has two transistors 10 and 11 connected to form a differential amplifier. The base terminals of the transistors 10 and 11 have a common potential supplied from a B+ source through a resistor 12. The emitter terminals of transistors 10 and 11 are returned to ground through resistors 13 and 14, respectively, and a common resistor 15. The collector terminals of the transistors 10 and 11 are returned to the B+ source through resistors 16 and 17, respectively. An output signal of voltage $V_o$ is taken between the collector terminals of transistors 10 and 11.

If the characteristics of transistors 10 and 11 are matched, and if additionally, resistors 13 and 14 are equal, and resistors 16 and 17 are equal, then the output voltage $V_o$ is zero when transistors 10 and 11 are subjected to the same environmental conditions. Any change in conditions which affects transistors 10 and 11 equally will be rejected by the differential arrangement and will not affect the output signal $V_o$. The output signal $V_o$ is calibrated to measure the power of the input signal by using input signals having known power values. Resistors 13, 14, 15, 16, and 17 may be chosen to optimize the common mode rejection and the differential gain of the differential amplifier according to well-known procedures.

A resistor 18 of suitable value is thermally coupled to the transistor 10. Such coupling may be accomplished by placing the resistor 18 in close proximity to transistor 10. Resistor 18 is thermally isolated from transistor 11. This may be accomplished by appropriate physical separation or by the use of insulation or combination thereof. The thermal isolation between resistor 18 and transistor 11 should be as good as practical but need not be perfect because the differential arrangement of transistors 10 and 11 will effectively treat any signal power coupled to both transistors 10 and 11 as a change in ambient conditions The calibration of the output voltage $V_o$ as a measure of the power of the input signal will depend in part on the degree of thermal isolation between resistor 18 and transistor 11.

The input signal from a signal source 19 is connected to the resistor 18 through terminals 20 and 21. Resistor 18 converts the electrical power of the input signal into thermal power which is then coupled to transistor 10. The thermal power that is generated equals the true mean power of the input signal. If source 19 is a voltage source, the thermal power generated in resistor 18, i.e., the mean power of the input signal, is also the same as the mean square voltage of source 19. If source 19 is a current source, the thermal power generated in resistor 18 is the same as the mean square of the current of source 19. Because of the temperature dependence of the volt-ampere characteristics of transistor 10, the thermal power is reflected as a change in the voltage at the collector terminal of transistor 10 which in turn directly affects the output signal $V_o$ of the differential amplifier. Thus, if transistor 11 is thermally isolated from the effects of resistor 18, the change in the output signal $V_o$ is a true measure of the mean power of the input signal.

The thermal mass of the detector circuit is sufficient to give adequate integrating effect when the input signal is a rapidly varying waveform. If the input signal is a slowly varying signal, however, a suitable capacitor, not shown, may be connected across the output, i.e., between the collector terminals of transistors 10 and 11, to obtain the required integration.

The detector circuit 101 can advantageously be made by integrated circuit techniques. Specifically, the characteristics of transistors 10 and 11 can be closely matched if they are formed simultaneously on a single chip or substrate. Also resistor 18 can be formed in very close proximity to transistor 10 by using integrated circuit techniques thereby obtaining excellent thermal coupling.

It is to be understood that the embodiment described herein is merely illustrative of the principles of the invention. Various modifications thereto may be made by persons skilled in the art without departing from the spirit and scope of the invention.

I claim:

1. Apparatus for measuring the mean power of an electrical signal comprising, in combination, first and second transistor differentially connected, said transistors comprising a single integrated circuit chip and having matched characteristics, a resistor for converting said power of said electrical signal to thermal power, said resistor being thermally coupled to said first transistor and thermally isolated from said second transistor, a pair of output terminals connected to the collector electrodes of said first and second transistors, and means for equally biasing said first and second transistors to cause equal conduction of both transistors when no thermal power is being coupled to the apparatus, whereby the difference in potential between said output terminals caused by increased conduction of the first transistor due to its increased temperature as a result of heating by thermal power generated in the resistor is a measure of said mean power of said signal.